(12) United States Patent
Renyer et al.

(10) Patent No.: US 8,348,103 B1
(45) Date of Patent: Jan. 8, 2013

(54) LOW-PROFILE SEED HANDLING SYSTEM WITH SEPARATE SEED BINS AND TURRET SEED FEEDER

(75) Inventors: Jim Renyer, Sabetha, KS (US); Greg Renyer, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 0 days.

(21) Appl. No.: 13/618,796

(22) Filed: Sep. 14, 2012

Related U.S. Application Data

(60) Continuation of application No. 13/463,173, filed on May 3, 2012, now abandoned, which is a division of application No. 13/196,041, filed on Aug. 2, 2011, now Pat. No. 8,177,095, which is a continuation of application No. 13/034,671, filed on Feb. 24, 2011.

(51) Int. Cl.
*A01C 1/06* (2006.01)
*G01G 13/24* (2006.01)

(52) U.S. Cl. ............ 222/190; 222/56; 222/77; 222/132; 222/185.1; 47/57.6; 118/303

(58) Field of Classification Search .................... 222/56, 222/59, 64, 77, 129, 132, 135, 137, 144, 222/190, 185.1; 47/57.6; 177/63–66; 414/269, 414/272; 118/303; 141/83, 248; 220/565–567, 220/601, 647
See application file for complete search history.

(56) References Cited

U.S. PATENT DOCUMENTS

| | | | |
|---|---|---|---|
| 282,424 A | 7/1883 | Watson | |
| 749,825 A | 1/1904 | Priestman | |
| 1,283,822 A | 11/1918 | Lehman | |
| 1,408,539 A | * 3/1922 | Simon | 141/104 |
| 1,710,771 A | 4/1929 | Gardiner | |
| 2,918,185 A | 12/1959 | Farnham et al. | |
| 3,021,646 A | 2/1962 | Williams | |
| 3,095,097 A | 6/1963 | Mellow | |
| 3,327,874 A | 6/1967 | Peterschmidt | |

(Continued)

FOREIGN PATENT DOCUMENTS

JP 58088623 5/1983

(Continued)

OTHER PUBLICATIONS

USC Slide Gate—Photographs of seed bin slide gate outlet assemblies made and sold by USC, L.L.C. of Sabetha, Kansas more than one year prior to Feb. 24, 2011.

*Primary Examiner* — J. Casimer Jacyna
(74) *Attorney, Agent, or Firm* — Hovey Williams LLP

(57) ABSTRACT

A low-profile particulate handling assembly is provided for use in conjunction with a downstream treating device, such as a seed treater unit. The assembly includes a plurality of juxtaposed particulate bins and a surmounting turret assembly designed to successively deliver particulates to the bins. The particulates within the bins are delivered to the downstream treating device through respective lower outlets each equipped with an adjustable slide gate assembly and a lower, multiple-chute assembly. Preferably, each bin has a top wall which in plan configuration approximates a sector of a circle, planar sidewalls, and downwardly tapered, arcuate sidewall structure leading to the lower outlet; in this fashion, the bins can be grouped with the sidewalls in close adjacency, and with the outlets located to feed into a single inlet of the downstream treating device.

10 Claims, 10 Drawing Sheets

U.S. PATENT DOCUMENTS

| | | | |
|---|---|---|---|
| 3,685,468 A * | 8/1972 | Paige et al. | 111/11 |
| 3,690,392 A | 9/1972 | Smith | |
| 3,730,395 A * | 5/1973 | Gallogly et al. | 222/145.5 |
| 3,910,429 A | 10/1975 | Zumsteg et al. | |
| 4,266,691 A | 5/1981 | Wolwowitz | |
| 4,320,775 A | 3/1982 | Stirling et al. | |
| 4,421,185 A | 12/1983 | Koto et al. | |
| 4,448,272 A | 5/1984 | Keller et al. | |
| 4,573,128 A | 2/1986 | Mazur | |
| 4,580,699 A | 4/1986 | Black et al. | |
| 4,616,978 A | 10/1986 | Matheson et al. | |
| 4,750,530 A | 6/1988 | Helle et al. | |
| 4,751,948 A | 6/1988 | Hertig et al. | |
| 5,033,706 A | 7/1991 | Poulton | |
| 5,415,323 A | 5/1995 | Fenelon | |
| 5,531,360 A | 7/1996 | Berdel et al. | |
| 5,636,762 A | 6/1997 | Juhola et al. | |
| 6,422,263 B1 | 7/2002 | Spicer | |
| 6,446,836 B1 | 9/2002 | Aalto et al. | |
| 6,582,516 B1 | 6/2003 | Carlson | |
| 7,001,466 B2 | 2/2006 | Hong et al. | |
| 7,140,516 B2 | 11/2006 | Bothor et al. | |
| 7,273,314 B1 * | 9/2007 | Whited | 366/172.1 |
| 7,475,796 B2 | 1/2009 | Garton | |
| 7,504,593 B2 | 3/2009 | Hanaoka et al. | |
| 2012/0181093 A1 * | 7/2012 | Fehr et al. | 177/103 |

FOREIGN PATENT DOCUMENTS

JP 59120821 7/1984

* cited by examiner

LOW-PROFILE SEED HANDLING SYSTEM WITH SEPARATE SEED BINS AND TURRET SEED FEEDER

CROSS-REFERENCE TO RELATED APPLICATION

This application is a continuation of application Ser. No. 13/463,173, filed May 3, 2012, which is a division of Ser. No. 13/196,041, filed Aug. 2, 2011, which is a continuation of application Ser. No. 13/034,671, filed Feb. 24, 2011, all of which are incorporated by reference herein in their entirety.

BACKGROUND OF THE INVENTION

1. Field of the Invention

The present invention is broadly concerned with low-profile, multiple-bin particulate handling assemblies for use with downstream particulate treating units or the like, in order to eliminate the need for especially configured buildings to house the handling assemblies and treating units. More particularly, the invention is concerned with such handling assemblies, the individual bins forming a part of the assemblies, and the combination of the handling assembly with downstream receiving or treating devices.

2. Description of the Prior Art

Agricultural seeds are commonly treated with various growth-promoting agents (e.g., pesticides and disease controlling materials) or the like. Seed treating assemblies generally include a lower seed treater with a seed supply tower above the treater designed to provide a continuous supply of seed to the latter. The tower typically has an uppermost seed bin with a surge bin below the seed bin, with the surge bin oriented to deliver seed to the treater. In practice, seed is conveyed by an inclined conveyor belt to the upper seed bin, which then feeds the surge bin. A significant problem with these types of seed treating assemblies is that they are very tall, on the order of 21 feet or more in height. Given that most normal building do not have this degree of height, it is often necessary to build a separate facility for a seed treating assembly, or to add a cupola to an existing building to accommodate the treating assembly. Either of these expedients adds significant cost.

There is accordingly a need in the art for low-profile seed handling apparatus which can be positioned above a seed treater to provide a continuous supply of seed thereto, while eliminating the need for purpose-built seed treating structures or add-ons to existing buildings.

References of interest include U.S. Pat. Nos. 749,825, 1,710,771, 3,690,392, 4,266,691, 4,320,775, 4,421,185, 4,448,272, 4,580,699, 4,616,978, 4,750,530, 4,751,948, 5,033,706, 5,415,323, 5,531,360, 5,636,762, 6,422,263, 6,446,836, 6,582,516, 7,001,466, 7,140,516, 7,475,796, 7,504,593, and Japanese reference JP59120821.

SUMMARY OF THE INVENTION

The present invention overcomes the problems outlined above, and provides improved handling assemblies for particulates, and especially agricultural seeds. In one aspect of the invention, the handling assemblies include a plurality of individual, juxtaposed particulate bins each having an upper bin inlet and a lower bin outlet, together with structure supporting the plurality of bins with each of the lower bin outlets in communication with a downstream receiver or device inlet. A rotary turret assembly having a turret inlet and a turret outlet is located above the plurality of bins, with the turret assembly being selectively rotatable so as to cause the turret outlet to successively come into registry with the individual bin inlets for delivery of particulate to the device inlet from each of the plurality of bins. Each of the bins is preferably supported by one or more load cells operable to individually monitor the weight of particulate within each bin.

In another aspect of the invention, the particulate handling assembly comprises a plurality of individual, juxtaposed particulate bins each having an upper bin inlet, a lower bin outlet, and sidewall structure extending between the bin inlet and the bin outlet. Each of the sidewall structures includes a sidewall section converging toward the downstream device inlet, and means is provided to support the plurality of bins with each of the lower bin outlets in communication with the downstream receiver or device inlet. A particulate feeding device is located above the plurality of bins and is operable to selectively deliver quantities of particulate to each of the upper bin inlets.

Each of the particulate bins forming a part of the handling assembly is advantageously designed to save space and minimize the complexity of the overall assembly. Specifically, the preferred particulate bin comprises a top wall, which in plan configuration is at least approximately a sector of a circle, with an outermost arcuate margin, an innermost margin, and a pair of inwardly extending, converging side margins extending between the ends of the outermost arcuate margin to the innermost margin. The top wall has an inlet adjacent the innermost margin of the top wall, which is configured to permit entrance of particulate into the bin. The bin also has sidewall structure extending downwardly from the top wall and including a pair of generally planar sidewalls depending from the top wall side margins, and an arcuate wall depending from the top wall arcuate margin, with the arcuate wall including an inwardly tapered wall section. A lower bin outlet is proximal to the lower ends of the sidewalls and the inwardly tapered wall section.

The invention is particularly suited for the handling of agricultural seeds in the context of seed treater systems. However, the invention also finds application in virtually any situation where particulates are to be provided in a controlled manner to a downstream receiver (e.g., a conveyor or other take-away structure) or downstream treating device.

DETAILED DESCRIPTION OF THE PREFERRED EMBODIMENT

Figure 1:
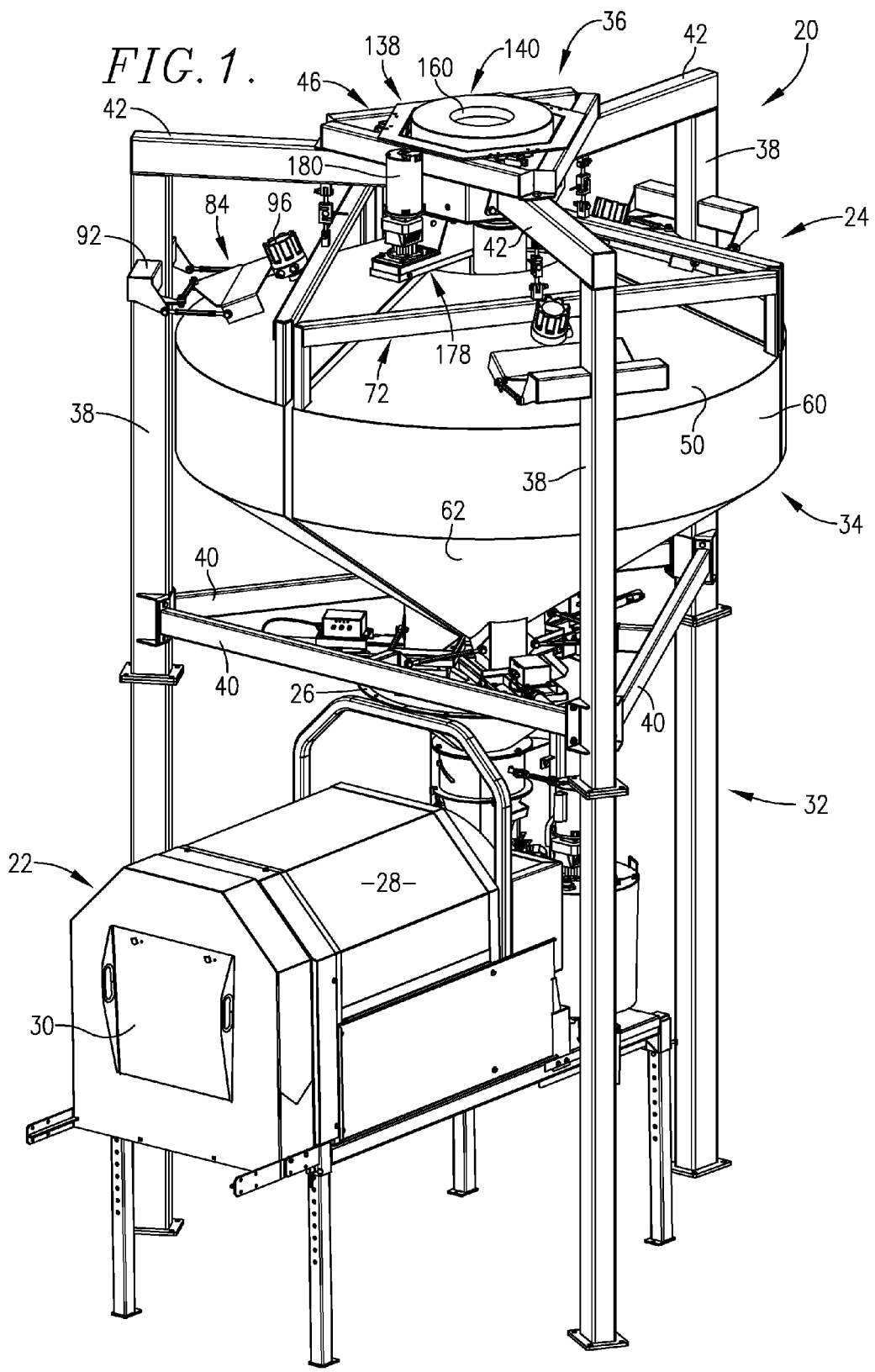
FIG. 1 is a perspective of a seed handling system in accordance with the invention, including a multiple-bin seed handling apparatus and a lower seed treater.
Figure 2:
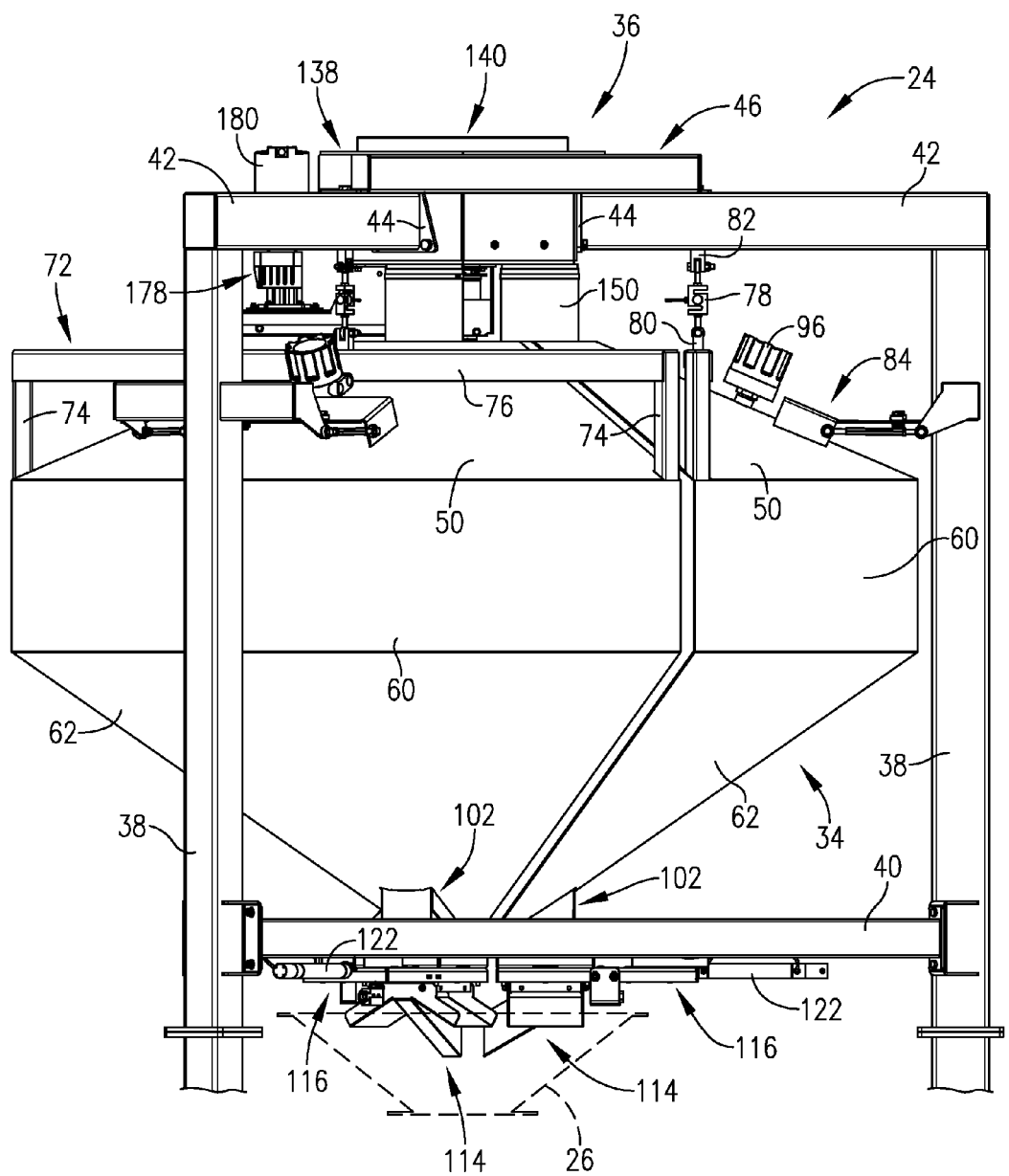
FIG. 2 is a fragmentary side elevational view of the system depicted in FIG. 1, with the treater inlet illustrated in phantom.

Turning now to the drawings, a seed treater system 20 is illustrated in FIG. 1 and broadly includes a seed treater unit 22 and a multiple-bin seed handling assembly 24 situated above the unit 22. The treater system 20 is designed to coat agricultural seeds with any one of a number of selected treating agents, and to deliver the treated seeds in known quantities to a conveyor or other exit device (not shown).

The seed treating unit 22 is itself conventional and includes an upper, open-top inlet 26, a treating chamber 28 and an outlet chute 30. A variety of commercially available treating units may be used in the overall seed treater system 20. Preferably, the unit 22 is one of the treaters sold by USC, LLC of Sabetha, Kans.

The seed handling assembly 24 generally includes frame structure 32, a plurality (here three) of juxtaposed, identical seed bins 34, and a rotary turret assembly 36 designed to supply incoming seed to each of the bins 34. As illustrated, the seed handling assembly 24 is operable to deliver seed to the inlet 26 of treating unit 22.

The frame structure 32 includes three equidistantly spaced, upright, sectionalized support legs 38 with intermediate cross-braces 40 extending between the legs 38. An inwardly extending support beam 42 is secured to the upper end of each of the legs 38 and has an innermost apertured connection plate 44. A triangular turret frame 46 having apex-mounted, apertured connection flanges 47 is positioned atop and secured to the midpoints of the support beams 42 by means of threaded connectors 48 extending through the flanges 47 and beams 42.

Each bin 34 (see FIG. 11) has atop wall 50, with an outermost arcuate margin 52, an inner margin 54, and a pair of inwardly extending, converging side margins 56. Each top wall 50 is a truncated conical sector. Accordingly, each top wall 50 in plan configuration approximates a sector of a circle, and particularly a 120° section. In preferred forms, the top wall 50 is not a complete sector, but is truncated by the inner margin 54. The bin 34 also has depending sidewall structure 58 including an arcuate upper section 60 depending from arcuate margin 52, and an inwardly tapered arcuate lower section 62 extending from the lower margin of the section 60. Each section 62 is also a conical sector, so that in a bottom view the sections 62 are in the shape of an approximate sector of a circle.

A pair of upright, substantially planar sidewalls 64 depend from the side margins 56. The inboard ends of the sidewalls 64 are interconnected by means of a planar segment 68. The top wall 50 and sidewall structure 58 are interconnected in order to define a seed holding interior space. The inner margin 54 of top wall 50 and the upper margins of the sidewalls 64 and segment 68 cooperatively define a seed inlet 70.

Figure 5A:
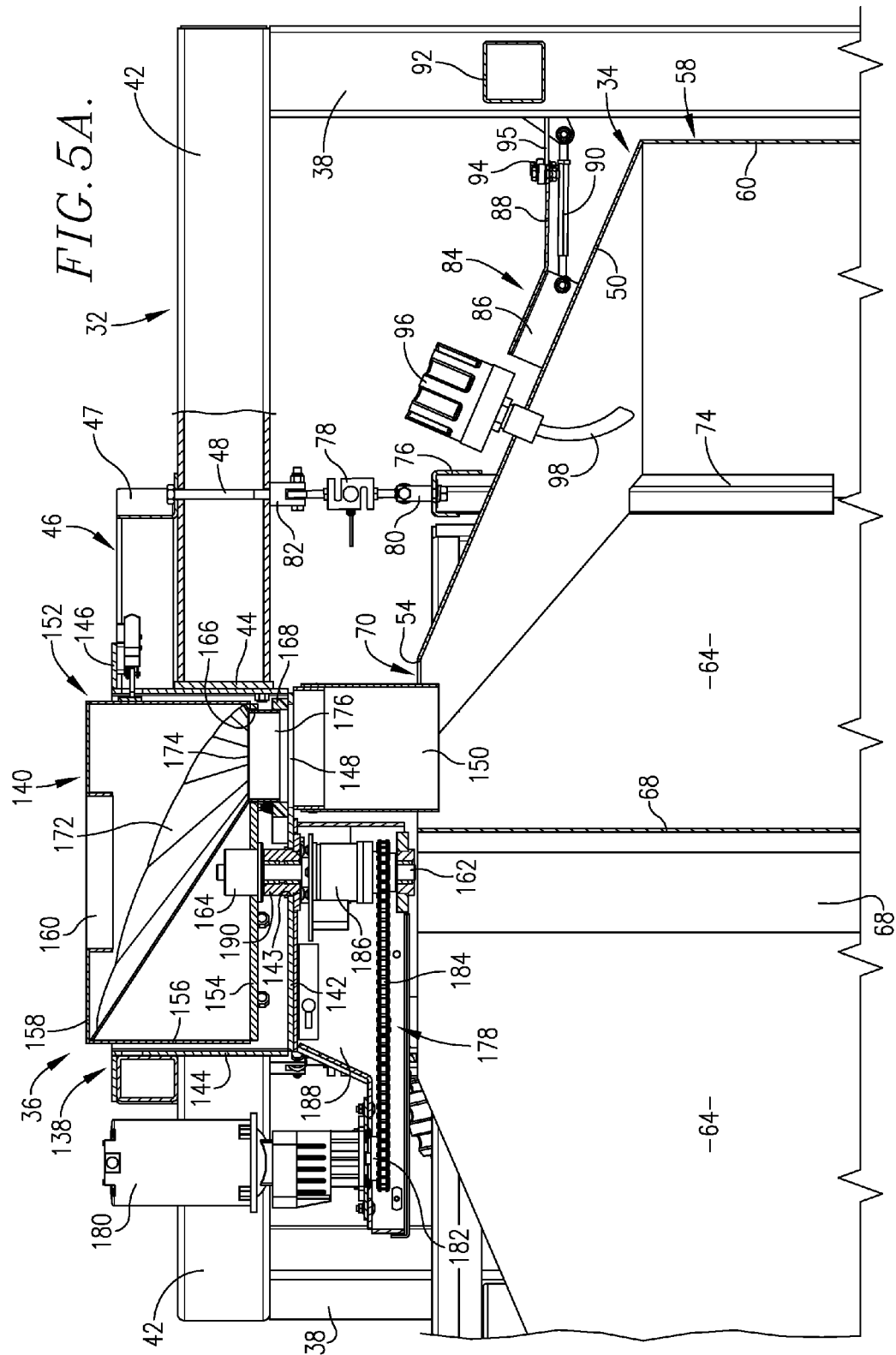
FIG. 5A is a fragmentary vertical sectional view of the seed handling apparatus, and illustrating in detail the construction of the upper turret assembly.
Figure 5B:
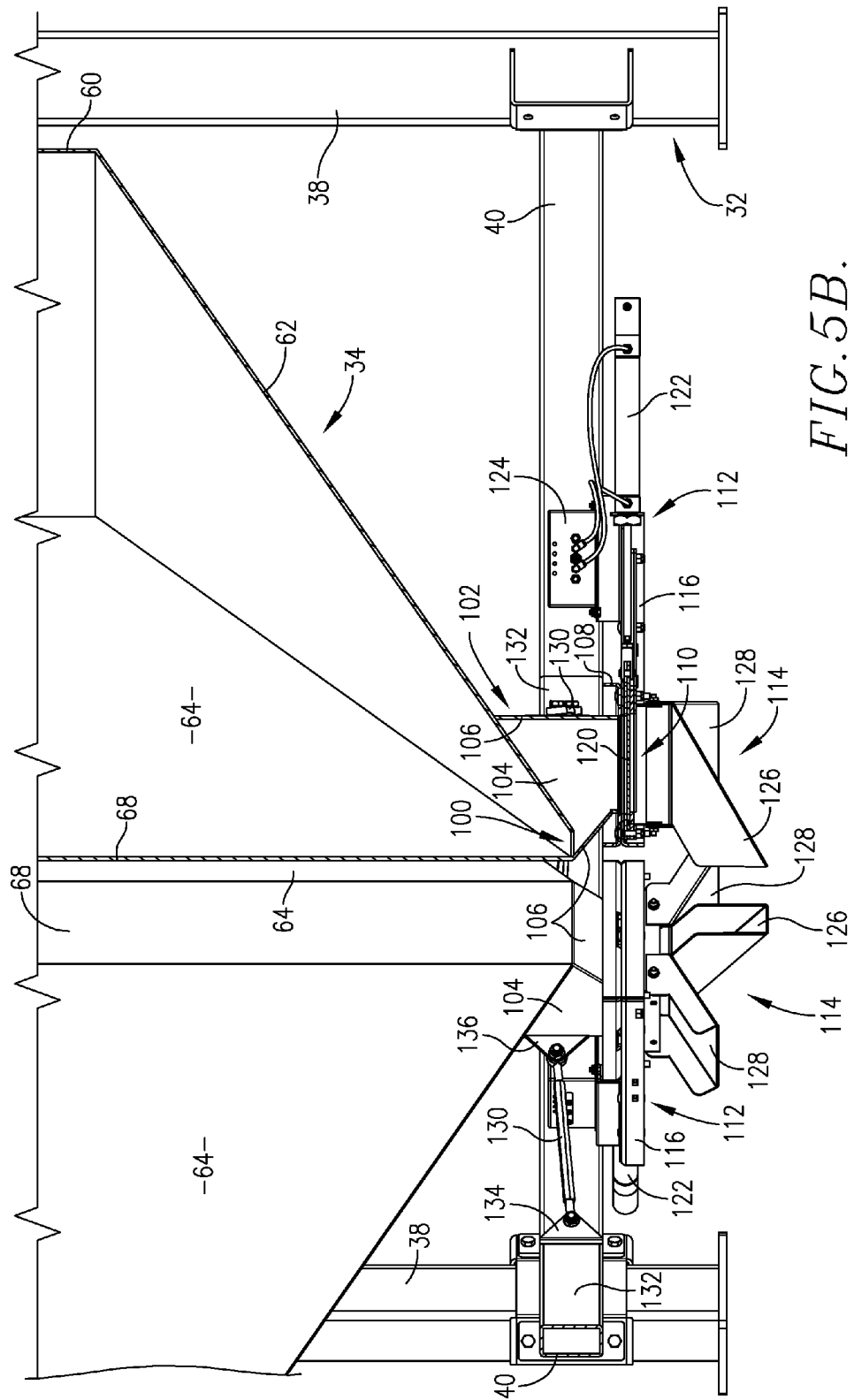
FIG. 5B is a fragmentary vertical sectional view illustrating in detail the outlet assembly of the seed handling apparatus.

Each bin 34 is equipped with a generally U-shaped support bail 72 having upwardly extending legs 74 at the juncture between the margins 52 and 56, with a cross-rail 76 secured to the upper ends of the legs 74. A load cell 78 is secured to the midpoint of cross-rail 76 by means of a lower clevis 80. The upper end of each load cell 78 is secured by means of an upper clevis 82 threaded to the lower end of the adjacent connector 48, so as to suspend each bin 34 from the associated support beam 42. In order to provide more precise weight control, a plurality of load cells 78 may be used in lieu of a single cell. A stabilizing assembly 84 is centrally secured to the upper surface of top wall 50 and includes a U-shaped body 86 and an upwardly inclined, apertured, generally triangular connector plate 88. A pair of adjustable links 90 are secured to the sidewalls of body 86 with the remote ends thereof attached to stabilizer beams 92 affixed to the adjacent support leg 38 of frame structure 32. An adjustable link 94 is connected between the plate 88 and a flange 95 forming a part of one of the beams 92. A conventional bin full sensor 96 is attached to top wall 50 and has an inwardly extending probe 98 (FIG. 5A).

Referring now to FIGS. 5B and 11-13, the lower outlet end of each bin 34 is depicted. Specifically, the tapered, lower arcuate sidewall section 62 has a lower opening 100. A delivery chute 102 comprising sidewalls 104 and end walls 106 depends from the lower end of the bin and has a surrounding box-like mounting flange 108. The opening 100 and delivery chute 102 thus define a lower seed bin outlet 110.

Figure 11:
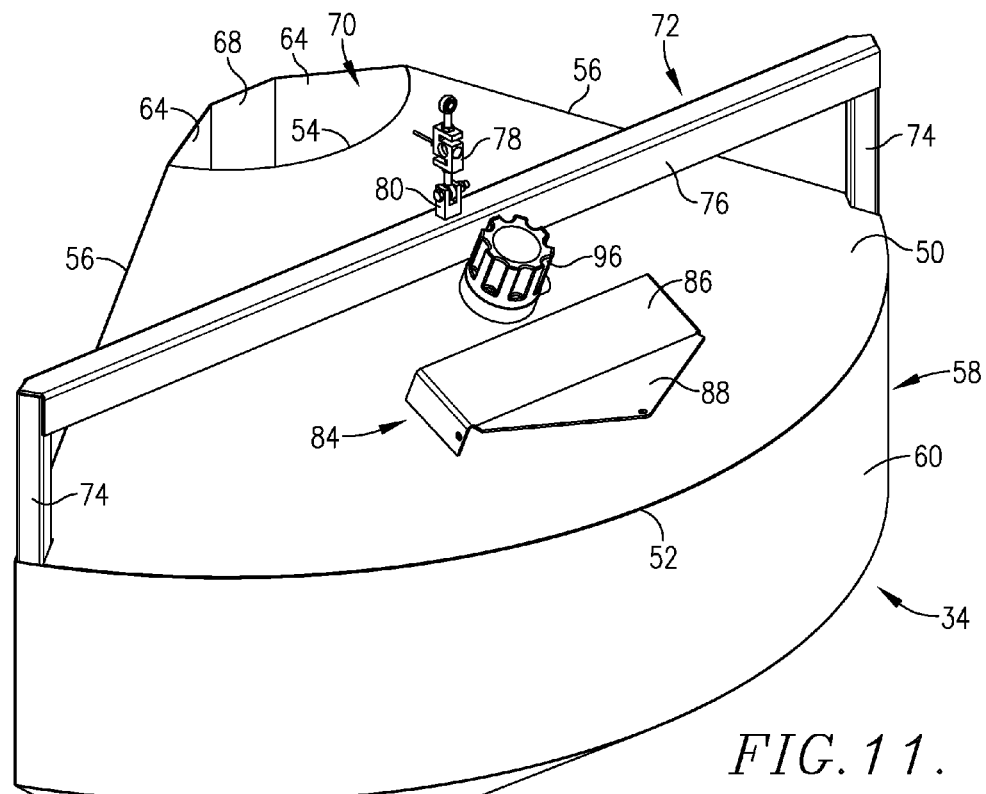
FIG. 11 is a perspective view of a single bin of the seed handling apparatus.
Figure 12:
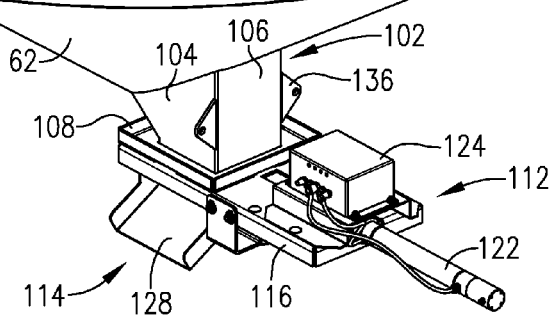
FIG. 12 is a fragmentary perspective view of an outlet of one of the bins of the seed handling apparatus.
Figure 13:
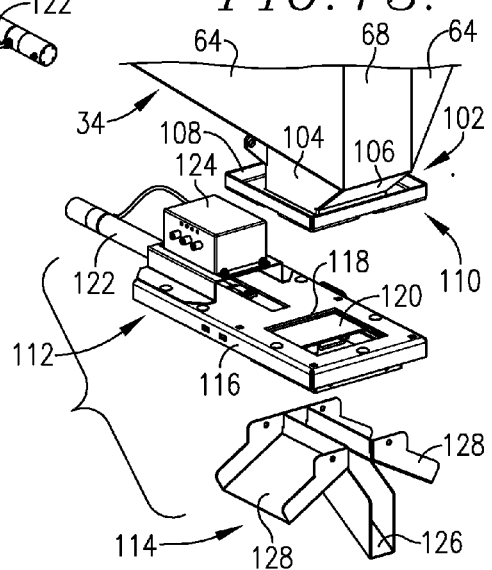
FIG. 13 is an exploded perspective view of the outlet illustrated in FIG. 12.

In order to selectively regulate the flow of seed from outlet 110, the bin 34 is equipped with a slide gate assembly 112 and a multiple-chute assembly 114. The slide gate assembly 112 includes a primary frame 116 with a through-opening 118. A selectively shiftable slide gate 120 is supported by the frame 116 and is shiftable in a fore-and-aft fashion between a fully closed position blocking flow of seed through the opening 118, and an infinite number of partially open intermediate positions and a full-open position. Each slide gate assembly 112 has a sensor for detecting whether the slide gate 120 is in a closed or open position. Movement of the slide gate 120 is effected by means of a double-acting pneumatic piston and cylinder assembly 122 equipped with an open slide gate position sensor. A control valve 124 is also supported on the primary frame 116 and is operatively coupled with the pneumatic cylinder and a digital controller (not shown) which controls the operation of the assembly 122. As illustrated in FIGS. 11 and 12, the primary frame 116 is designed to mate with the flange 108, such that the lower seed outlet opening 110 is in registry with through-opening 118.

The chute assembly 114 is secured to the underside of primary frame 116 and comprises a relatively narrow central chute 126 and a pair of oppositely outwardly extending wider chutes 128. Seed delivered through opening 118 is thus separated into three individual streams by the chutes 126, 128.

Figure 10:
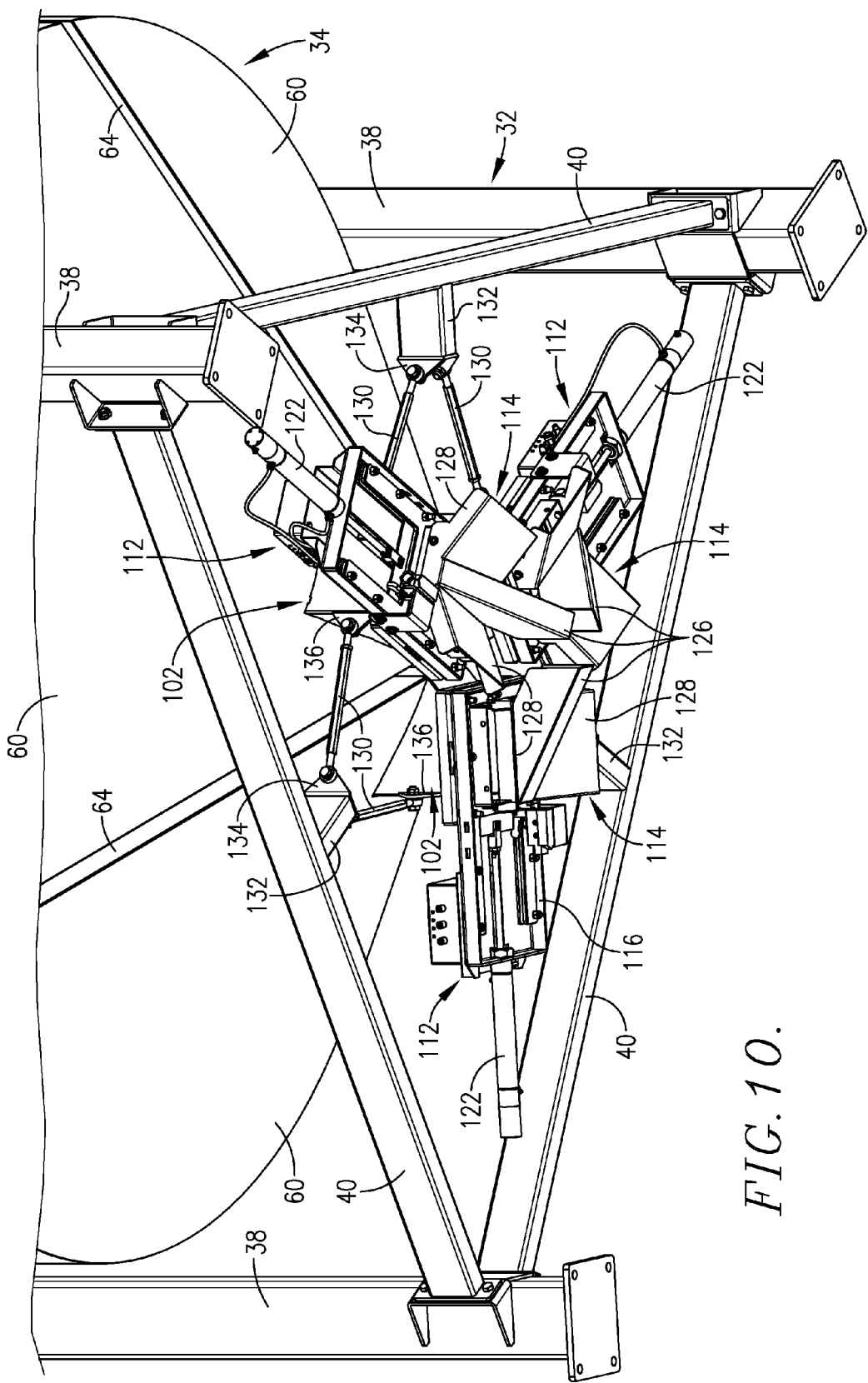
FIG. 10 is a fragmentary perspective view illustrating the outlet assembly of the seed handling apparatus.

In order to stabilize the lower end of the bin 34, a pair of oppositely outwardly extending adjustable links 130 are connected to the chute 102 and the adjacent cross-braces 40. To this end, the cross-braces 40 are provided with central, inwardly extending stubs 132, and the links 130 are interconnected between flanges 134 on the stubs 132, and flanges 136 on the chute 102 (see FIGS. 10-11).

Figure 3:
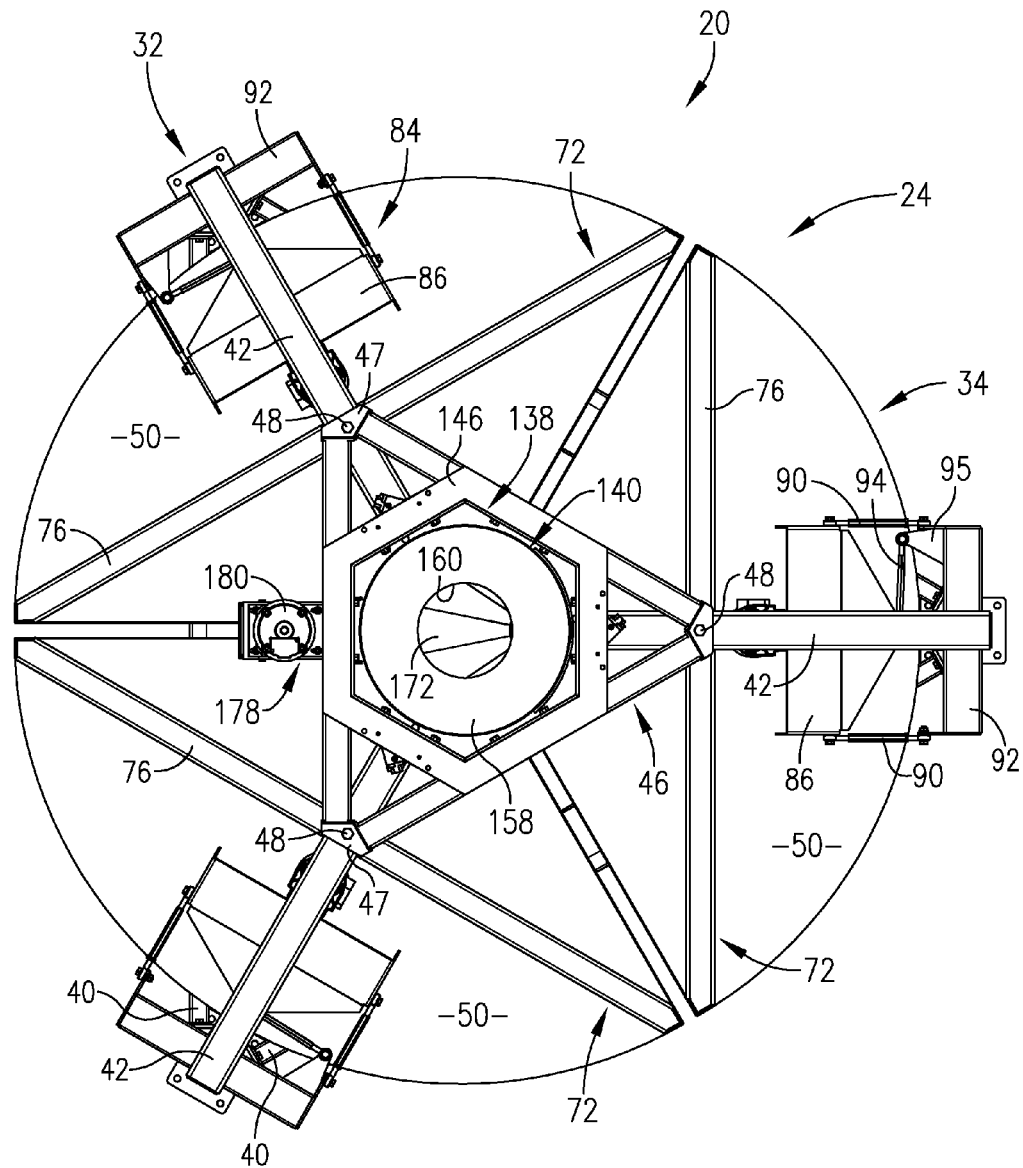
FIG. 3 is a plan view of the seed handling apparatus.
Figure 4:
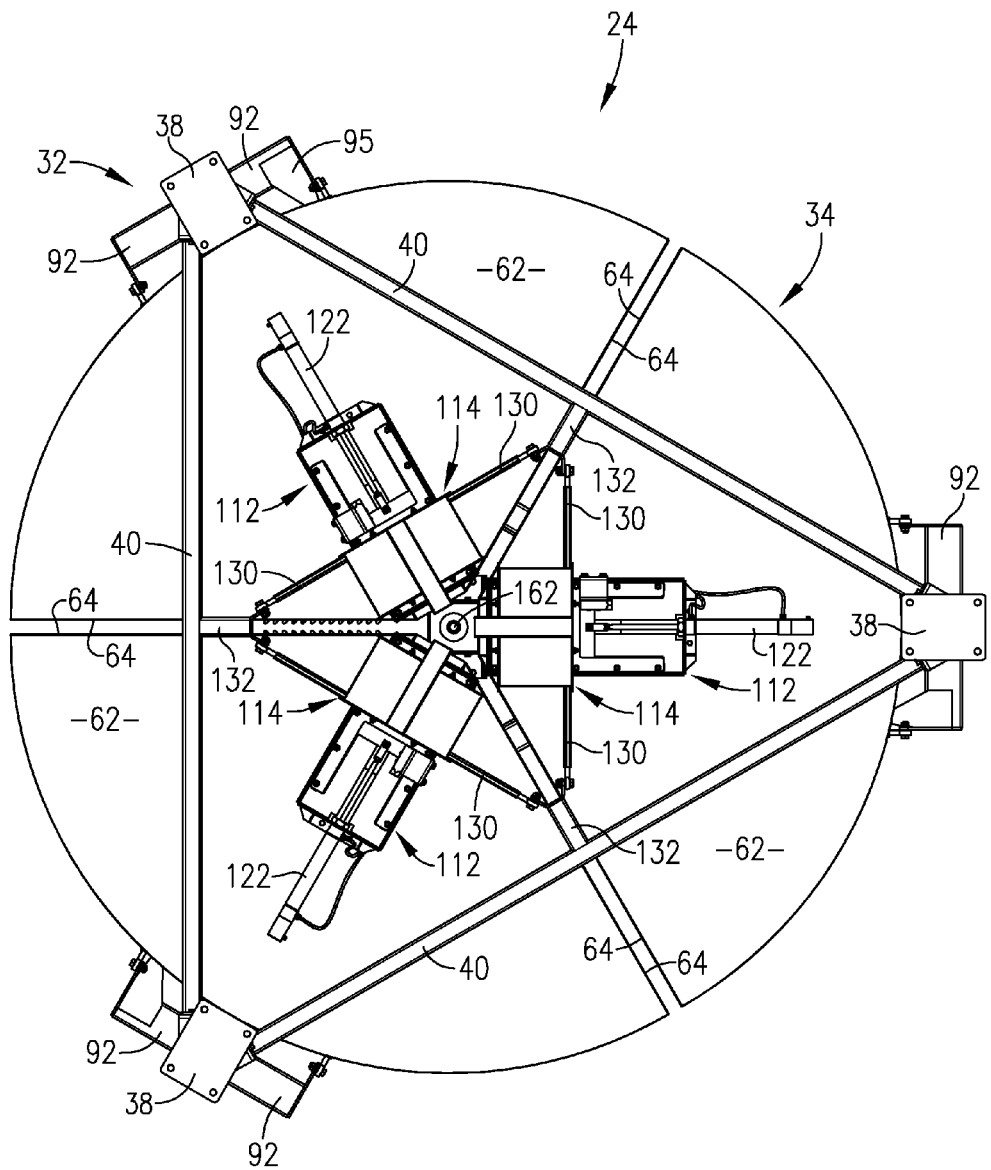
FIG. 4 is a bottom view of the seed handling apparatus.
Figure 7:
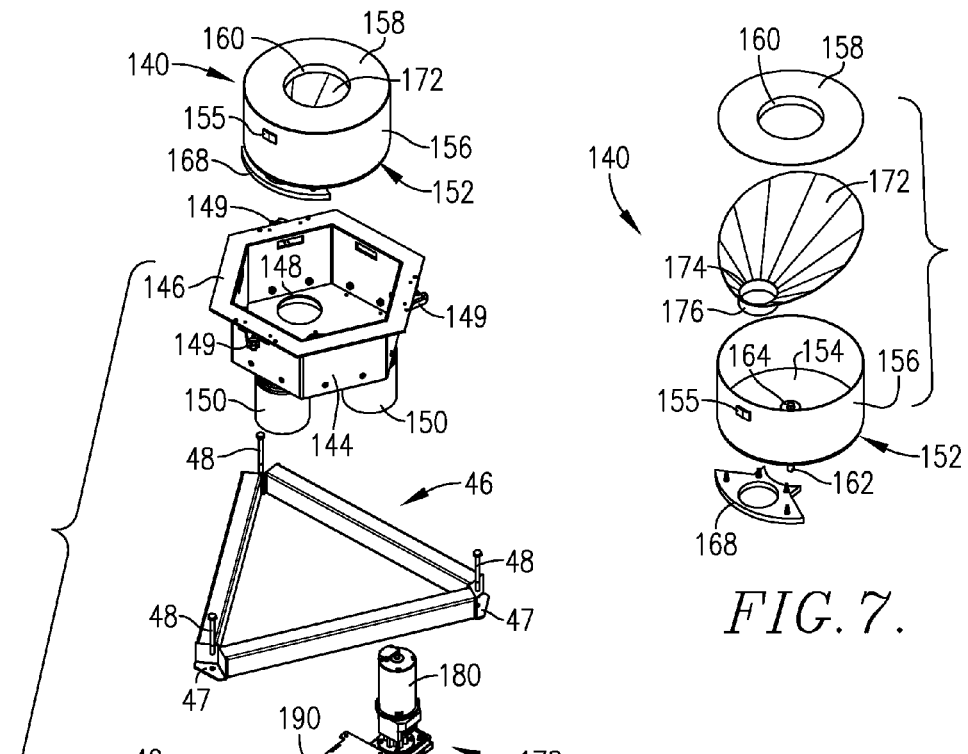
FIG. 7 is an exploded perspective view of the upper turret assembly of the seed handling apparatus.

The turret assembly 36 is best illustrated in FIGS. 5A and 7. The assembly 36 generally has a stationary turret mount 138 and a rotary turret 140 within the mount. The mount 138 is hexagonal in configuration, having a bottom wall 142 equipped with a central bearing opening 143, six interconnected, upstanding sidewalls 144, and an uppermost, circumscribing mounting lip 146. The bottom wall 142 has three equidistantly spaced through-openings 148. The sidewalls 144 support three equidistantly spaced location sensors 149 which are designed to sense the position of turret 140. Three flexible tubular guides 150 are secured to the underside of bottom wall 142 in registry with the corresponding openings 148. The turret mount 138 is supported on turret frame 46 with the lip 146 overlying the bars making up frame 46 (FIGS. 3 and 5A).

The turret 140 comprises a cylindrical housing 152 including a bottom wall 154, upstanding, circular sidewall 156, and a top wall 158 having a central inlet opening 160. A sensor element 155 is secured to the outer surface of sidewall 156 and is oriented to be sensed by the location sensors 149. The housing 152 is equipped with a central drive shaft 162 secured by a coupler 164 and extending below bottom wall 154. The bottom wall 154 also has an offset outlet opening 166, with an apertured seal plate 168 positioned below the opening 166 and in registry therewith. The seal plate 168 is secured to bottom wall 154 by means of connecting bolts 170 passing through the plate 168 and threaded into bottom wall 154, with conical springs disposed about each bolt 170. An obliquely oriented chute 172 is located within housing 152 and has a lower opening 174 with a short, downwardly extending, tubular transition 176.

Figure 6:
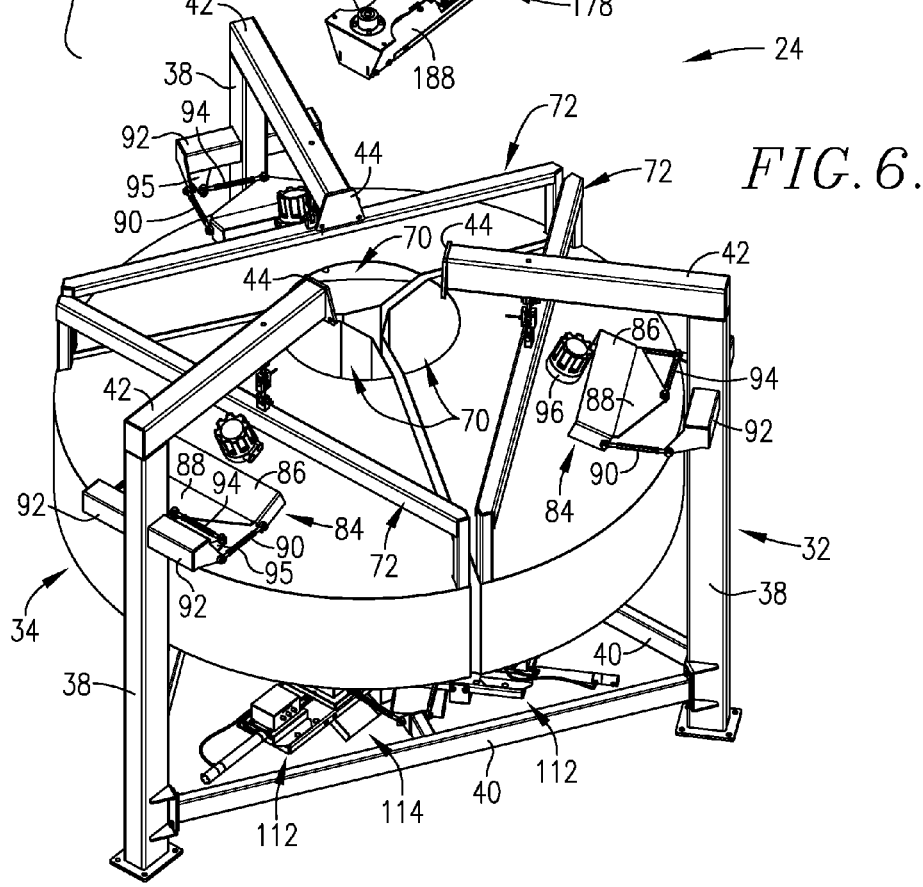
FIG. 6 is an exploded perspective view of the seed handling apparatus.

A drive unit 178 (FIGS. 5A and 6) is located beneath the turret mount 138 and includes an electric drive motor 180 having an output sprocket 182 and a drive chain 184 trained about the sprocket 182. The chain 184 is also trained about a clutch assembly 186 receiving shaft 162.

The sprocket 182, chain 184, and clutch assembly 186 are located within the surrounding housing 188. The latter has an upstanding, tubular bearing assembly 190.

As best seen in FIG. 5A, the turret 140 is received within the turret mount 138, with the drive shaft 162 extending through the bearing assembly 190 and clutch assembly 186, such that the turret 140 is rotatable relative to the turret mount 138. Hence, operation of motor 180 serves to rotate turret 140, as will be described in detail below.

In practice, three of the bins 34 are supported in juxtaposed relationship by the frame structure 32, so that the grouped bins present a substantially circular configuration in plan. Each such bin is supported by one or more load cells 78, the latter interconnected between an upper support beam 42 and an underlying bail 72. In this orientation, the sidewalls 64 of the bins 34 are in close, parallel adjacency, and the flexible tubular guides 150 extend into the corresponding bin seed inlets 70, and the tapered sidewall sections 62 converge towards a common lower apex. The three chute assemblies 114, being closely adjacent and near the bottom of the respective bins, are sized to be received within the inlet 26 of seed treater system 20. The stabilizing couplers 90, 94, and 130 serve to maintain the position of the suspended bins 34 within the frame structure 32.

Control of the seed handling assembly 24 is accomplished through one or more programmable digital controllers (not shown) which are suitably connected with the aforementioned sensors, load cells 78, control valves 124, and the drive motor 180 and clutch assembly 186 forming a part of the turret drive unit 178. The controller(s) are appropriately programmed to carry out the operation of assembly 24, as described below. Such programming is conventional and well within the skill of the art.

Operation

Figure 8:
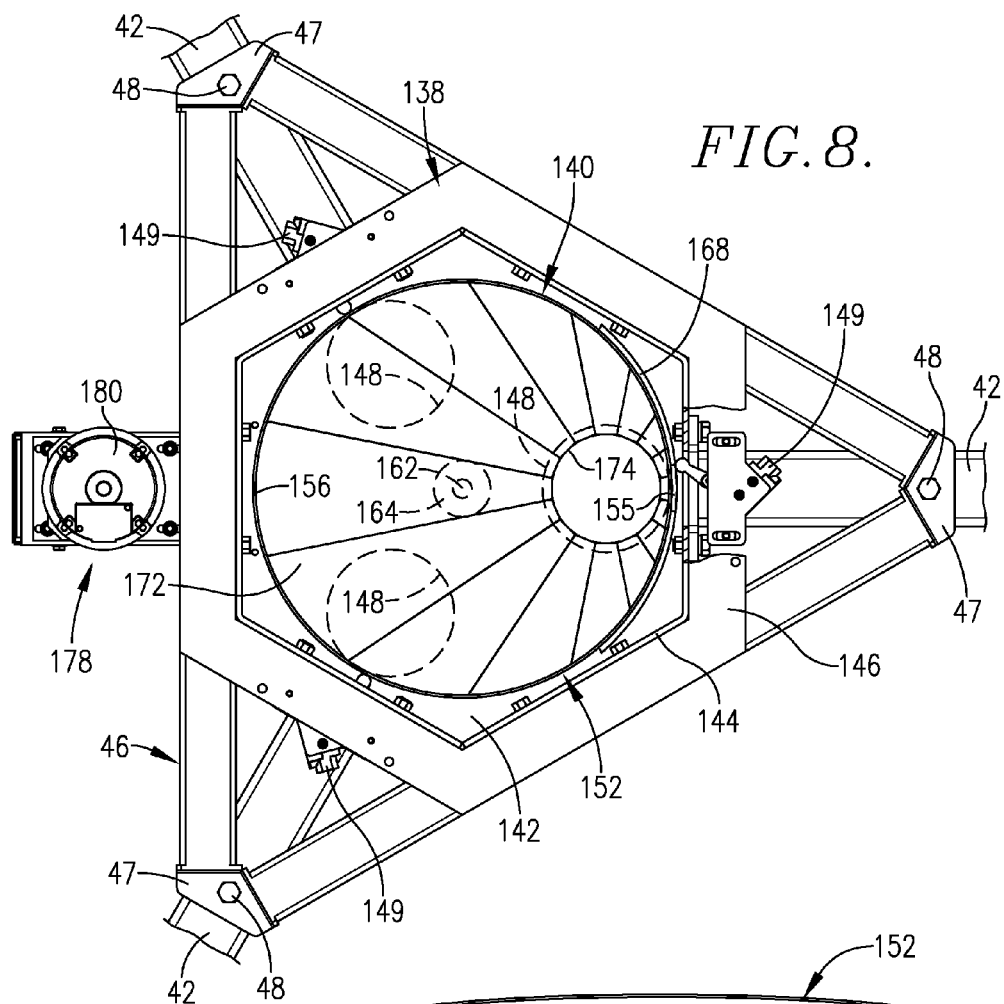
FIG. 8 is a fragmentary plan view of the seed handling apparatus, with the top wall of the turret assembly removed.
Figure 9:
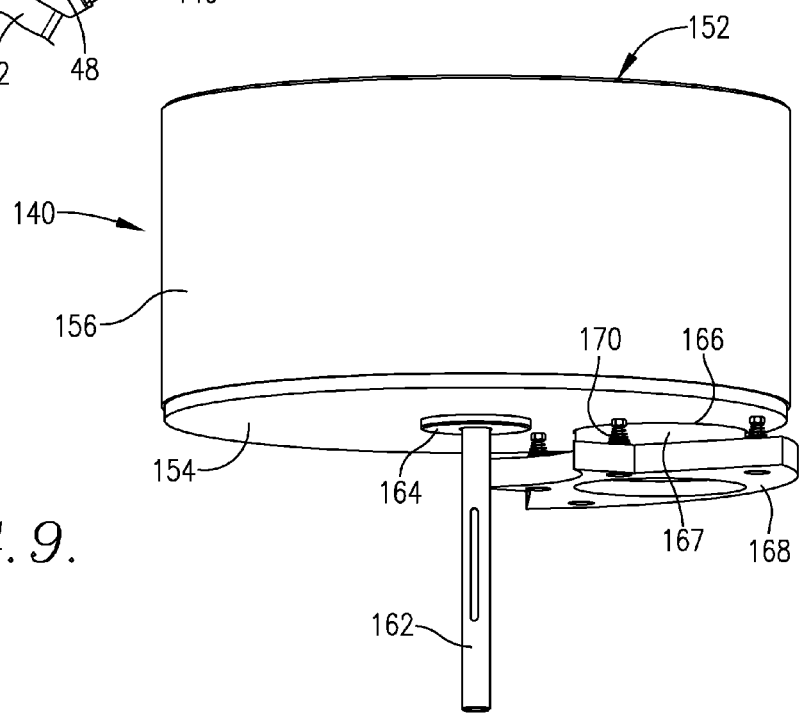
FIG. 9 is a perspective view of the turret assembly, illustrating the spring-biased seal plate at the outlet of the turret assembly.

In the operation of seed handling assembly 24, incoming seed is delivered through the turret central inlet opening 160 by any convenient means. Typically, this is effected by an inclined conveyor leading from a supply of seed to the opening 160. The incoming seed is sequentially diverted to each of the bins 34 by appropriate positioning of the rotary turret 140 within turret mount 138, so that the lower opening 174, the opening of seal plate 168, and transition 176 of the chute 172 come into registry with one of the through-openings 148 of bottom wall 142. This is illustrated in FIGS. 5A and 8 where the opening 174 and transition 176 are in registry with one of the openings 148, with the other two openings circumferentially spaced from the one opening 148. Seed is delivered to the associated bin 34 by passage along chute 172, through opening 174 and transition 176, and ultimately through the guide 150 into the interior of the bin.

As seed accumulates within one of the bin 34, the weight of the bin is monitored by the associated load cell(s) 78 and bin full sensor 96. When the one bin is filled to the desired degree, the turret 140 is shifted or indexed via turret drive unit 178 so that the lower opening 174 and transition 176 of turret 140 come into registry with the next adjacent opening 148 and guide 150, and the process is repeated. During such movement, the spring-biased seal plate 168 engages the upper surface of bottom wall 142. Precise positioning of the turret 140 is obtained by means of the position sensors 149 and sensor element 155. In this fashion, the turret 140 successively diverts seed to and fills the three bins 34.

Simultaneously with this stepwise filling of the bins 34, seed is delivered through the lower bin outlets 110, slide gate assemblies 112, and multiple-chute assemblies 114. Flow of seed is controlled by the respective positions of the slide gate assemblies 112. Thus, the seed travels from the seed bins 34, through delivery chutes 102 and through-openings 118, as governed by positions of the slide gates 120.

Desirably, the bins 34 are filled and emptied using known loss-in-weight techniques, so that a substantially even supply of seed is delivered to the inlet 26 of seed treating unit 22. This also allows computation of the precise amount of seed delivered to the treater 22. Therefore, certified seed weights can be provided to a buyer, without the need for a separate weighing step.

It will thus be seen that the present invention provides a low-profile seed handling assembly which permits smooth, substantially even flow of seed to a downstream treating device, such as a seed treater unit. Moreover, while the invention has been described in the context of seed handling, it will be appreciated that the invention could readily be adapted for use in handling virtually any type of particulate material.

We claim:

1. A seed treating assembly, comprising:
    frame structure including a plurality of upright, spaced apart legs configured to rest upon a support surface for the seed treating assembly and defining therebetween an open area, said legs and frame structure being stationary during operation of the seed treating assembly;
    an elevated seed bin assembly supported by said frame structure and including a plurality of individual, juxtaposed seed-receiving bins each having an upper bin inlet, a lower bin outlet, upright sidewall structure, and obliquely oriented sidewall structure, said sidewall structures located between said bin inlet and said bin outlet, and oriented to deliver seed to said bin outlet,
    each upright sidewall structure of each bin being in close adjacency with the upright sidewall structure of another bin, and with at least portions of the obliquely oriented sidewall structures thereof being generally opposed to and converging towards each other, and with the bin outlets proximal to each other;
    weight-monitoring structure operably coupled with each of said bins in order to individually monitor the weight of seed within each of the bins during operation of the seed treating assembly;
    an outlet device operably coupled with each of said lower bin outlets in order to regulate the flow of seed from the corresponding lower bin outlet; and a seed treating device located between said legs at least partially within said open area and beneath said bin assembly, said seed treating device having inlet structure within the open area, said proximal lower bin outlets each located to deliver seed to said device inlet structure.

2. The seed treating assembly of claim 1, there being three of said bins, each of said bins being at least approximately a sector of a circle in plan configuration.

3. The seed treating assembly of claim 1, said weight-monitoring structure including at least one load cell operably coupled with each bin.

4. The seed treating assembly of claim 1, each of said outlet devices comprising a slide gate having a plate adjacent said lower bin outlet, and structure for selective shifting of the plate between a closed position blocking flow of seed, and a plurality of open positions permitting flow of seed from said lower bin outlet at different rates.

5. The seed treating assembly of claim 1, including a seed delivery assembly located above said bin assembly and including selectively shiftable seed delivery structure operable to successively come into communication with said bin inlets for delivery of seed to each of said bin inlets.

6. The seed treating assembly of claim 1, said weight-monitoring structure operably coupled with each of said bins in order to support said plurality of bins on said frame structure.

7. The seed treating assembly of claim 1, said seed treating device being a seed coater.

8. The seed treating assembly of claim 1, said frame structure including a plurality of cross-braces extending between and interconnecting said upright legs, said cross-braces oriented above said seed-treating device.

9. The seed treating assembly of claim 1, said obliquely oriented sidewall structures of said bins converging toward a common lower apex within said area.

10. The seed treating assembly of claim 1, said inlet structure comprising a frustoconical device.

* * * * *